US008005510B2

(12) United States Patent
Fischer

(10) Patent No.: US 8,005,510 B2
(45) Date of Patent: Aug. 23, 2011

(54) CELL SITE POWER CONSERVATION

(75) Inventor: Steve Fischer, Tampa, FL (US)

(73) Assignee: T-Mobile USA, Inc., Bellevue, WA (US)

( * ) Notice: Subject to any disclaimer, the term of this patent is extended or adjusted under 35 U.S.C. 154(b) by 650 days.

(21) Appl. No.: 12/170,696

(22) Filed: Jul. 10, 2008

(65) Prior Publication Data

US 2010/0009694 A1 Jan. 14, 2010

(51) Int. Cl.
*H04B 1/38* (2006.01)
(52) U.S. Cl. ....................................... 455/561
(58) Field of Classification Search ............... 455/19, 455/25, 61.3–65, 561–562.1, 269–279.1, 455/572–575.5, 107; 375/315; 370/335–337, 370/342–345
See application file for complete search history.

(56) References Cited

U.S. PATENT DOCUMENTS

| | | | |
|---|---|---|---|
| 5,185,684 A | 2/1993 | Beihoff et al. | |
| 5,894,407 A | 4/1999 | Aakalu et al. | |
| 5,934,079 A | 8/1999 | Han et al. | |
| 5,939,990 A | 8/1999 | Ahn | |
| 6,223,037 B1 | 4/2001 | Parkkila | |
| 6,304,059 B1 | 10/2001 | Chalasani et al. | |
| 6,343,498 B1 | 2/2002 | Oba et al. | |
| 6,463,295 B1 * | 10/2002 | Yun | 455/522 |
| 6,533,031 B1 | 3/2003 | Garcia et al. | |
| 6,639,769 B2 | 10/2003 | Neiger et al. | |
| 6,782,264 B2 * | 8/2004 | Anderson | 455/456.1 |
| 6,889,752 B2 | 5/2005 | Stoller | |
| 6,929,785 B2 | 8/2005 | Grieve et al. | |
| 2004/0218567 A1 | 11/2004 | Budka et al. | |
| 2005/0213527 A1 | 9/2005 | Xie | |
| 2006/0182262 A1 | 8/2006 | Goldman et al. | |
| 2007/0119638 A1 | 5/2007 | Grieve | |
| 2008/0013528 A1 | 1/2008 | Miller et al. | |
| 2008/0064361 A1 | 3/2008 | Bjork et al. | |
| 2010/0007506 A1 | 1/2010 | Fischer | |
| 2010/0009724 A1 | 1/2010 | Fischer | |
| 2011/0021186 A1 | 1/2011 | Fisher | |

FOREIGN PATENT DOCUMENTS

EP 1296464 10/2007
WO WO-97/34432 A1 9/1997

OTHER PUBLICATIONS

International Search Report and Written Opinion for PCT/US2009/050313; Applicant T-Mobile USA, Inc.; Date of Mailing: Sep. 3, 2009, 14 pages.
International Search Report and Written Opinion for PCT/US2009/050315; Applicant: T-Mobile USA, Inc.; Date of Mailing: Sep. 10, 2009, 12 pages.
Generator Start Control Module—Mini (2 Wire to 3 Wire), Atkinson Electronics, Inc., REV Sep. 2005, 8 pages.

(Continued)

*Primary Examiner* — Thai Hoang
(74) *Attorney, Agent, or Firm* — Perkins Coie LLP

(57) ABSTRACT

Systems, apparatus, methods, and manufactures for conserving power in a communications system such as a communications service cell site. The methods include adjusting the RF coverage of the cell site antenna, selective control of the RF output transmit power, selective control of the communications bit rate, transfer of communications to other cell sites, adjustment of indicators such that mobile devices transfer communications to other cell sites, and reallocation of logical slots between radios in the cell site.

29 Claims, 5 Drawing Sheets

OTHER PUBLICATIONS

Ericsson Site Solution, Diesel and Battery in Hybrid Operation, Ericsson, Mar. 17, 2008, 13 pages.
U.S. Appl. No. 12/726,265, filed Mar. 17, 2010, Fischer.
"Battery Charging," IdaTech Advance Fuel Cell Solutions, Feb. 25, 2009, 1 page.
"ElectraGen™ XTi Integrated Fuel Cell System," IdaTech LLC., Copyright 2002-2007, 2 pages.
"Fuel Cells," IdaTech Advanced Fuel Cell Solutions, Feb. 25, 2009, 1 page.
"Fuel Processing," IdaTech Advanced Fuel Cell Solutions, Feb. 25, 2009, 1 page.
"Glossary," IdaTech Advance Fuel Cell Solutions, Feb. 25, 2009, 2 pages.
"iGen™ Fuel Cell Power Supply," IdaTech LLC., Copyright 2002-2007, 2 pages.
"Methanol," IdaTech Advanced Fuel Cell Solutions, Feb. 25, 2009, 2 pages.
"Proton exchange membrane fuel cell," Wikipedia, Feb. 25, 2009, 6 pages.
"System Design," Hunter International, Aug. 22, 2008, 2 pages.
"Types of Fuel Cell Technology," IdaTech Advanced Fuel Cell Solutions, Feb. 25, 2009, 1 page.
"Adaptive multi-rate compression", Wikipedia, May 12, 2008, http://en.wikipedia.org/wiki/Adaptive_Multi-Rate, 3 pages.
"GSM", Wikipedia, Apr. 24, 2008, http://en.wikipedia.org/wiki/GSM, 7 pages.
"Handoff", Wikipedia, Apr. 24, 2008, http://en.wikipedia.org/wiki/Handoff, 5 pages.
"Node B", Wikipedia, May 12, 2008, http://en.wikipedia.org/wiki/Node_B, 2 pages.

* cited by examiner

CELL SITE POWER CONSERVATION

BACKGROUND

The popularity of commercial wireless communications services (e.g., wireless telephony, wireless network access, and wireless email) has substantially increased during recent years. In many cases, users, such as consumers, mobile workers, emergency response personnel, and/or the like, now utilize these services for both personal and business communications. Likewise, users are increasingly relying on these services. For example, some households forgo wired telephone service in favor of wireless telephone service, some government agencies rely on these services for both routine and emergency communications, and businesses rely on these services to communicate with customers and mobile workers. Correspondingly, the cost (both financial and nonfinancial) of outages is also increasing.

Typical commercial wireless communications service (CMRS) providers rely on remote facilities to facilitate the provision of services. For instance, CMRS providers rely on cell sites (e.g., base stations, radio repeaters, wireless to backhaul interfaces, etc.) to facilitate some communications services. If a cell site experiences a loss of commercially-provided electrical power, users near the cell site may experience a service outage. Power outages are an example of a common cause for cell site failures. For example, natural disasters, rolling brownouts, accidents, and/or the like may result in power outages. While most cell sites include some form of back-up power (e.g., generators and/or batteries), these forms of back-up power may not provide sufficient power during lengthy power outages and may require servicing, monitoring, and on-site maintenance. During lengthy power outages, use of commercial wireless communications services may increase due to users' needs and/or desires. Further, pending regulations may require commercial wireless communications service providers to provide cell sites with at least seven days of back-up power.

DETAILED DESCRIPTION

Overview

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

As one non-limiting example, the technology may be employed for conserving power in a communications system such as a wireless communications service cell site. For example, the technology may be employed to conserve power during reduced availability periods of a power source. A cell site's run time from back-up power may be increased by employing the various power conservation features described below. For example, the cell site may decrease the back-up battery circuit discharge rate, may decrease the back-up generator fuel consumption rate, and/or the like.

The below described power conservation features may also decrease both capital and operating costs for providing back-up power to a cell site. For example, pending Federal Communications Commissions (FCC) regulations may require commercial wireless communications service providers to provide cell sites with at least seven days of back-up power. Likewise, Environmental Protection Agency (EPA), state, and local regulations may regulate storage of large amounts of back-up generator fuel. In addition, the cost, size, and weight of back-up batteries may limit the number of batteries that can be practically located at a cell site. For these and other reasons, the power conservation features described below may be employed to increase the back-up power run time for cell sites.

This Detailed Description describes illustrative environments in which the invention may be practiced, and an illustrative block diagram of a communications system, an illustrative logical diagram, and an illustrative logical flow diagram for practicing the invention.

Illustrative Environments

Figure 1:
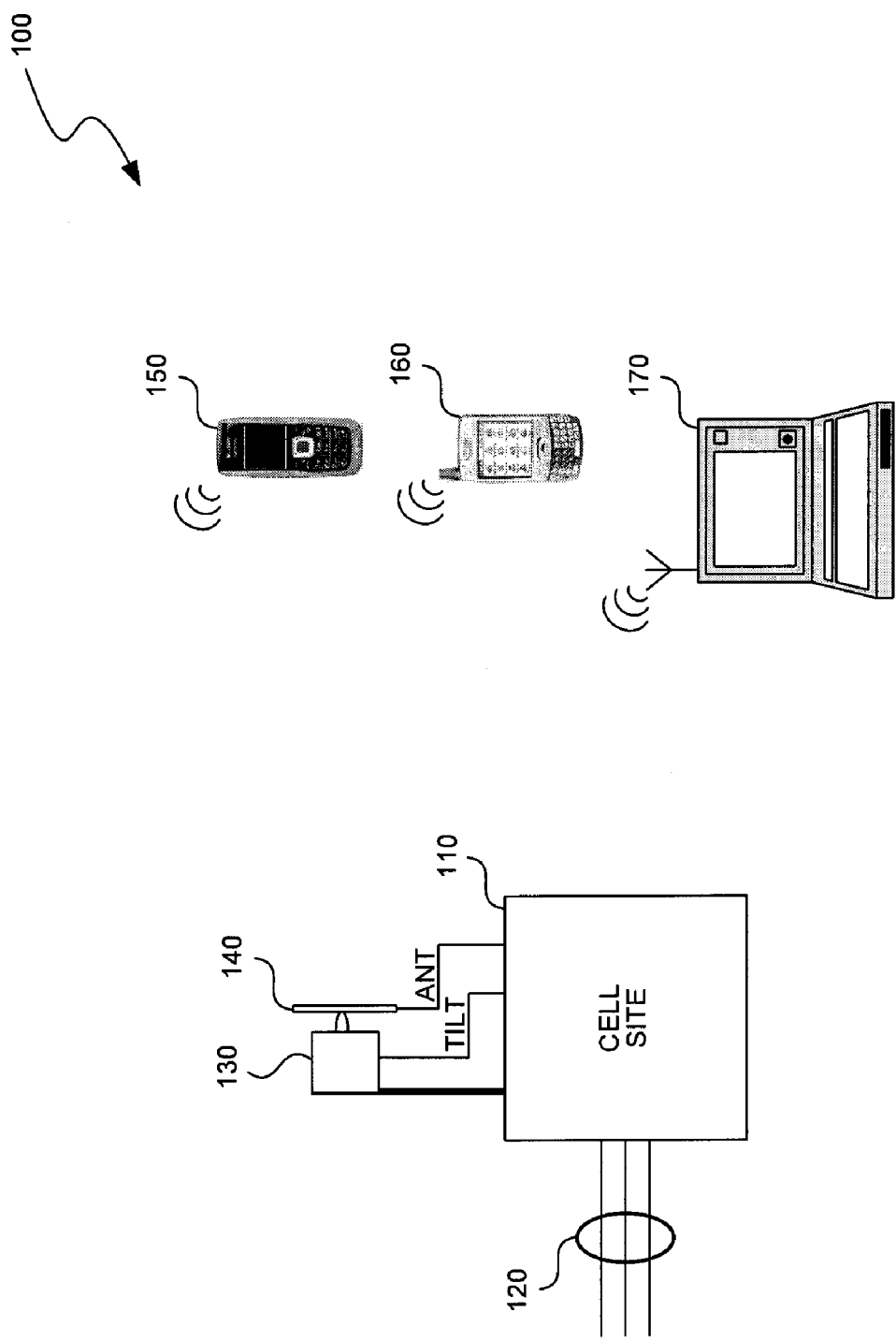
FIG. 1 is a diagram of a suitable environment for practicing the invention.

FIG. 1 is a diagram of environment 100 in which the invention may be practiced. As shown, environment 100 includes cell site 110, remote tilt mechanism 130, antenna 140, and mobile devices 150-170. Cell site 110 is coupled to backend interface 120. Cell site 110 and mobile devices 150-170 are configured to wirelessly communicate with each other.

Cell site 110 may include virtually any device for facilitating wireless network access. For example, cell site 110 may be a wireless telephony base station, a wireless network access base station, a wireless email base station, and/or the like. As an example, cell site 110 may be operated by a mobile telephony service provider. Generally, cell site 110 is configured to provide a network interface for mobile devices 150-170 by providing an interface (via antenna 140) between mobile devices 150-170 and backend interface 120. Cell site 110 and mobile devices 150-170 may communicate using any wireless protocol or standard. These include, for example, Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), and/or the like.

Backend interface 120 may provide a network connection to cell site 110. For example, backend interface 120 may include one or more T-1 connections, T-3 connections, OC-3 connections, frame relay connections, Asynchronous Transfer Mode (ATM) connections, microwave connections, Ethernet connections, and/or the like. In addition, backend interface 120 may provide an interface to a telephone switch (e.g., to a 5ESS switch, a Private Branch Exchange switch, a base station controller, etc.), to a data network (e.g., to a router, network switch, a Radio Network Controller (RNC)), and/or the like.

In addition, backend interface 120 may also provide power to cell site 110. For example, backend interface 120 may include connections to commercial power sources of virtually any type. For example, cell site 110 and backend interface 120 may receive power from a public utility, from solar power, from a turbine, from a fuel cell, and/or the like. At times, however, the power source may provide insufficient power for long term and/or full-power operation of cell site 110. While cell site 110 may include back-up power sources, it may be beneficial to conserve power at cell site 110 during such reduced availability periods. Such power conservation may increase the back-up power run time of cell site 110.

Remote tilt mechanism 130 may be included to control a tilt angle of antenna 140. The tilt angle of antenna 140 may, for example, define a radio frequency (RF) coverage (e.g., coverage area, footprint, pattern, etc.) of cell site 110. Remote tilt mechanism 130 may include an electronically controlled actuator such as a solenoid, motor, and/or the like and may be configured to tilt antenna 140 based, at least in part, on tilt signal TILT.

Antenna 140 may be included to facilitate communications between mobile devices 150-170 and cell site 110 and is coupled to cell site 110 via antenna signal ANT. Antenna 140 may be any type of suitable antenna. One example of a suitable antenna includes a directional flat panel antenna having fixed gain and fixed azimuth angle. However, other types of antenna may also be suitably employed. For example, omni-directional antennas, lossy transmission lines, beam steerable antennas, variable gain antennas, and/or the like may be employed as appropriate. Antenna 140 may also include a preamplifier (not shown) to preamplify received signals. Cell site 110 may be coupled to any number of antennas. For example, a typical cell site may provide coverage to three sectors of approximately 120° each. One or more antennas may provide coverage to each sector. However, in other systems, any other number of antennas and/or sectors may be employed. Also, antenna 140 may be either a tiltable or a non-tiltable antenna.

Remote tilt mechanism 130 may be omitted in some environments. For example, remote tilt mechanism 130 may be omitted if antenna 140 is an omnidirectional antenna, a beam steerable antenna, and/or the like.

Mobile devices 150-170 may include virtually any devices for communicating over a wireless network. For example, mobile devices 150-170 may include mobile telephones (e.g., cellular telephones, GSM telephones, TDMA telephones, LTE telephones, etc.), wireless data devices (e.g., Personal Digital Assistants (PDAs), computers, pagers, etc.), and/or the like.

Table 1, below, introduces various power conservation features that may be employed in cell site 110 and/or in environment 100 to selectively conserve power. These power conservation features are described in greater detail below.

TABLE 1

Power conservation features.

| | |
|---|---|
| 1 | selective adjustment of the RF coverage of antenna 140 |
| 2 | selective control of an RF output transmit power level |
| 3 | selective control of a communications bit rate |
| 4 | transfer of communications to other cell sites |

TABLE 1-continued

Power conservation features.

| | |
|---|---|
| 5 | adjustment of indicators such that associated mobile devices transfer communications to other cell sites |
| 6 | reallocation of communications between radios and logical slots of cell site 110 |

In addition, the various power conservation features of Table 1 may also be employed in conjunction with the fuel conservation and other technologies described in U.S. patent application Ser. No. 12/170,675 (entitled CELL SITE POWER GENERATION), the entirety of which is hereby incorporated by reference.

These other power conservation features may be selectively enabled based, at least in part, on power source availability. The various power conservation features may also be selectively enabled based, at least in part, on other environmental parameters. For example, environmental parameters may include the amount of RF interference, the distance between cell site 110 and mobile devices 150-170, topography, geography, and/or the like.

As one example, the RF interference may be quantified through a carrier to interference ratio (C/I). However, in other examples, a signal to noise ratio (SNR), a bit error rate (BER), a frame error rate (FER), and/or the like may also be suitably employed. In addition, resource management (e.g., base station traffic load, system traffic load, etc.) and aggregate call quality may be factors to determine which, if any, power conservation features are employed with each particular mobile device or communications channel. For example, while cell site 110 communicates with a mobile device over a favorable C/I channel (e.g., greater than 20 dB), more power conservation features may be employed. However, if the channel between cell site 110 and another mobile device has a less favorable C/I (e.g., less than 9 dB), less power conservation may be employed. In this way, cell site 110 may balance power consumption and call quality considerations. Also, the various power conservation features may be individually or collectively employed in any combination. For example, multiple or all of the power conservation features of Table 1 may be simultaneously employed during certain conditions such as during extended power outage, when back-up power is low, when call volume is high, and/or the like.

Cell site 110 may be configured to selectively tilt antenna 140 to selectively define, in part, its RF coverage. For example, changing the RF coverage of antenna 140 may affect power consumption by increasing or decreasing the number of mobile devices associated with cell site 110. Selective tilting of antenna 140 is discussed in further detail with respect to FIG. 2.

Cell site 110 may be further configured to selectively control its RF output transmit power. For example, cell site 110 may selectively decrease its RF output transmit power as a power conservation feature or increase its RF output transmit power to increase its RF coverage. While this selective control may include changing the RF output transmit power by any suitable amount, as one example, cell site 110 may be configured to increase or decrease its RF output transmit power in 2 decibel (dB) steps.

Additionally, cell site 110 may be configured to selectively control a communications bit rate for voice traffic. For example, cell site 110 may decrease its voice traffic communications bit rate while operating from back-up power and increase its bit rate while operating from a commercial power source. By lowering the communications bit rate, cell site 110 may process a given amount of voice traffic while employing fewer radios and/or logical slots. Unused radios and/or logical slots may be disabled to conserve power.

As one example, a suitable bit rate may be configured by selecting between codecs such as a full-rate codec, an enhanced full-rate codec, a half-rate codec, various modes of an adaptive multi-rate codec, and/or the like. Selection between these codecs may affect both the compression for the voice traffic and the bit-rate of additional information that is transmitted with the compressed voice traffic. This additional information may include padding, forward error correction coding, other error coding and/or the like. In addition, discontinuous transmission (DTX) thresholds and/or the like may also be adjusted based, at least in part, on the power source availability status. Adjustment of DTX thresholds may further affect the communications bit-rate.

In addition, the communications bit rate may also be selectively controlled based, at least in part, on environmental parameters. For example, a codec and/or bit rate may be selected based, at least in part, on the C/I of a particular logical slot. This codec and/or bit rate may then be adjusted based, at least in part, on the power source availability status. For example, during a commercial power source outage, a bit-rate that is one or two steps lower than would otherwise be employed for the given C/I level may be employed as a power conservation feature.

Cell site 110 may also be configured to transfer voice and/or data traffic from mobile devices 150-170 another cell site. For example, cell site 110 may employ directed retries, forced handoffs, and/or the like. By decreasing communications, cell site 110 may decrease the number of radios in operation, the number of active logical slots, the amount of voice traffic, and/or the like. In turn, this may reduce power consumption at cell site 110.

Likewise, cell site 110 may be configured to adjust indicators such that mobile devices transfer communications to other cell sites, such as adjacent and/or neighboring cell sites. As one example, cell site 110 provides indicators to mobile devices 150-170 to indicate an estimated or calculated service level for communications with both cell site 110 and other cell sites. These indicators may represent a signal level (e.g., RSSI, C/I, BER, FER, etc.) received from mobile devices 150-170 at each cell site within a geographical area. These indicators may also be based, at least in part, on a cell 1 reselect (C1) value or a cell 2 reselect (C2) value from a base station controller such as base station controller 350 shown in FIG. 3.

Mobile devices 150-170 may then employ these indicators to request association with a particular cell site. Cell site 110 and/or an associated component (e.g., system controller 320, OMC 330, switch 340, base station controller 350, or RNC 360 of FIG. 3) may adjust these indicators to offset the indicated levels from the estimated or calculated values. For example, cell site 110 and/or the associated component may adjust the C1 or C2 values and/or a receiver access minimum value such that mobile devices 150-170 may be induced to prefer and/or transfer association with, or to, an adjacent or neighboring cell site operating from a commercial power source.

In addition, cell site 110 may reallocate communications between radios and logical slots of cell site 110 based, at least in part, on the commercial power source outage status. For example, cell site 110 may employ different radios and/or logical slots to facilitate communications between cell site 110 and mobile devices 150-170. Reallocation of logical slots is discussed in further detail with respect to FIG. 4.

As one example, cell site 110 draws approximately 39 amperes of current (at approximately −56 volts) while operating at full power. By enabling a half-rate codec instead of a full-rate codec, the current draw decreases to approximately 31 amperes. By additionally decreasing the transmitter output power by 2 dB, the current draw decreases to approximately 27 amperes. By additionally decreasing the transmitter output power by another 2 dB, the current draw decreases to approximately 24 amperes. In this example, a commercial wireless communications service provider may prefer the 27 ampere consumption level as a balance between power consumption and system performance.

Figure 2:
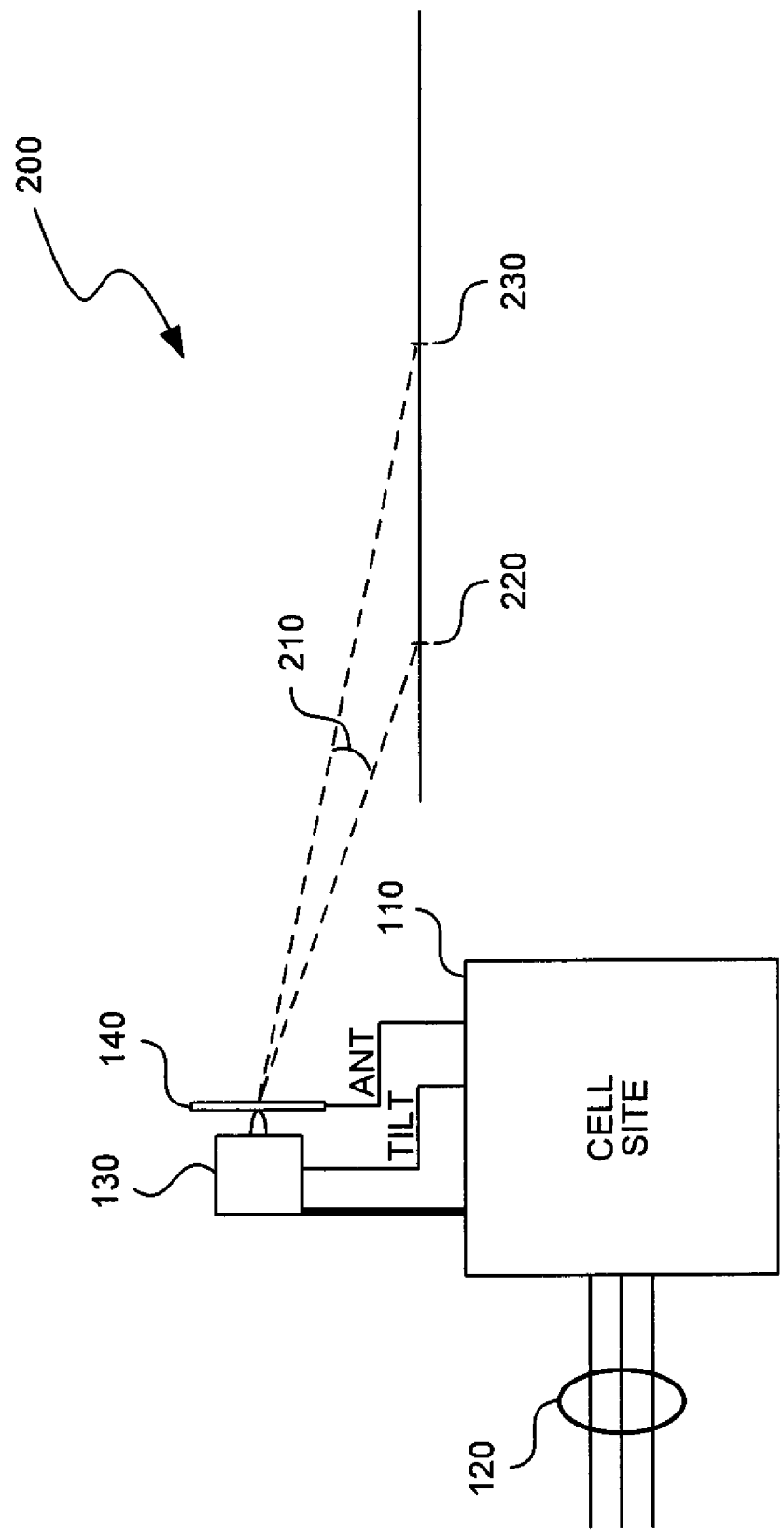
FIG. 2 is a diagram of another suitable environment for practicing the invention.

FIG. 2 is a diagram of environment 200 in which the invention may be practiced. As shown, environment 200 includes cell site 110, remote tilt mechanism 130, and antenna 140. FIG. 2 illustrates the relationship between elevation difference angle 210, location 220, and location 230. FIG. 2 is not drawn to scale.

As discussed above, cell site 110 may be configured to selectively tilt antenna 140 to define, in part, its RF coverage. As shown in FIG. 2, the tilt angle of antenna 140 defines, in part, the communications range of cell site 110. For example, if set at a first angle while cell site 110 provides a constant RF output transmit power, the communications range may reach location 220. However, if antenna 140 is up-tilted by elevation difference angle 210, the communications range may be extended to location 230 for the same RF output transmit power. While the C/I for communications with cell site 110 may decrease, up-tilting antenna 140 may be employed with corresponding RF output transmit power decreases to maintain a coverage area while conserving power. Tilting of antenna 140 may be accomplished either by mechanically tilting antenna 140 or by beam-steering the elevation angle of antenna 140.

As one example of a communication system, antenna 140 may be up-tilted by approximately 4° during normal operation. During a commercial power source outage, antenna 140 may be up-tilted by an elevation difference angle of approximately 2° (to approximately 6°) while the RF output transmit power is reduced by 2 dB. In addition, during an extended commercial power source outage, antenna 140 may be up-tilted by two times the elevation difference angle (to approximately 8°) while the RF output transmit power is reduced by an additional 2 dB. However, any other suitable elevation difference angles and/or RF output transmit power reductions may be employed.

However, the elevation difference angles discussed herein are merely provided as an example of elevation difference angles in one system. Such elevation difference angles may depend on a vertical beam width, an azimuth angle, environmental conditions, and/or the like for a particular system and/or antenna. Other elevation difference angles may be employed to provide and/or maintain coverage in a geographical area. Likewise, elevation difference angles may be selected to adjust a hand-off point at which a mobile device may hand-off from cell site 110 to an adjacent or neighboring cell site.

Illustrative Communications System

Figure 3:
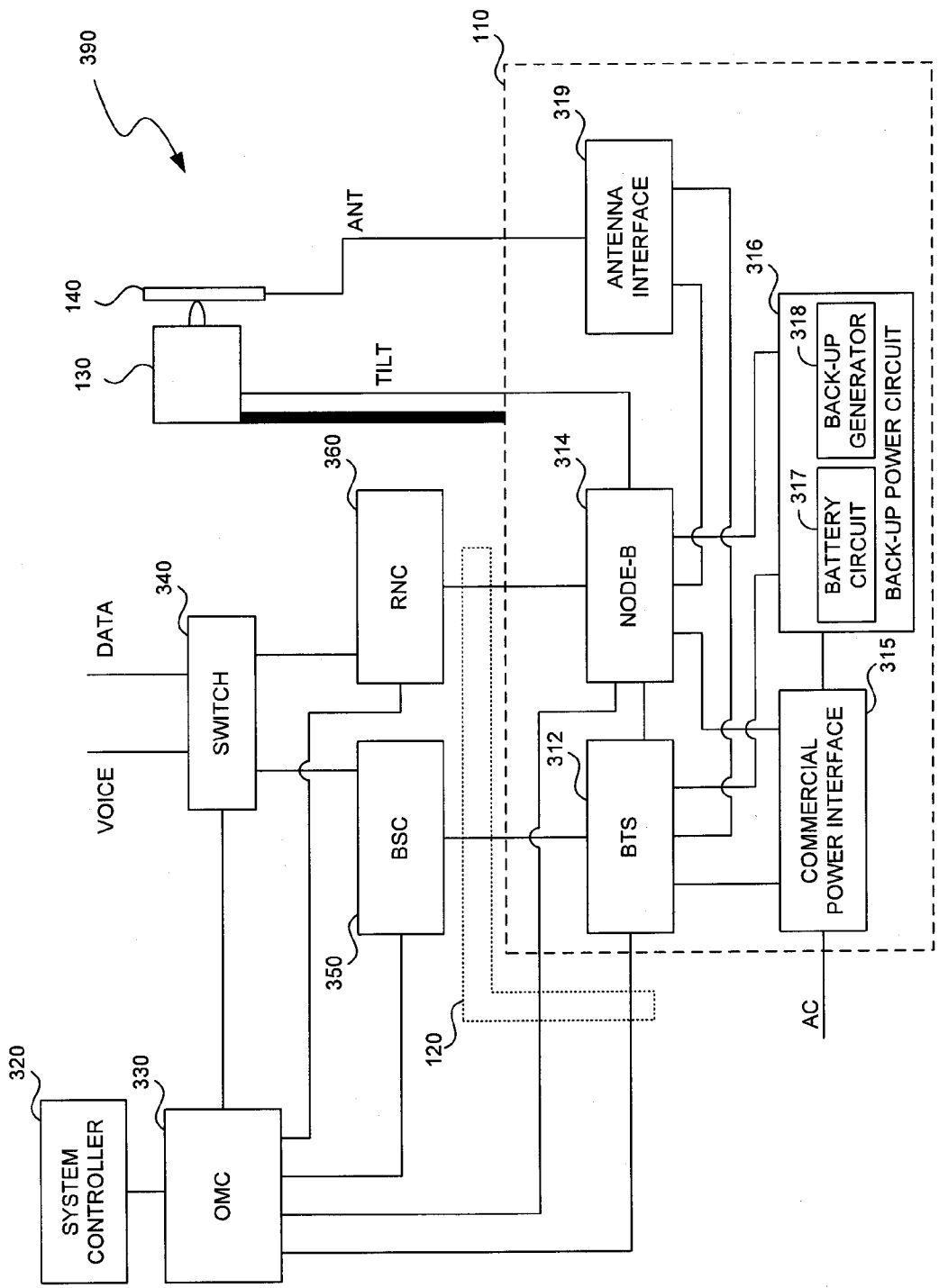
FIG. 3 is a block diagram of a communications system usable in the environments of FIGS. 1 and 2.

FIG. 3 is a block diagram of communications system 390. Communications system 390 includes cell site 110, remote tilt mechanism 130, antenna 140, system controller 320, operations and maintenance center (OMC) 330, switch 340, base station controller 350, and RNC 360. Cell site 110 includes base station 312, Node-B 314, commercial power interface 315, back-up power circuit 316, and antenna interface 319. Back-up power circuit 316 includes battery circuit 317 and back-up generator 318. Communications system 390 is illustrated as a GSM/UMTS communications system, however, the invention is not limited to GSM/UMTS communications systems. For example, the invention may also be practiced in an LTE and/or other fourth generation wireless environment.

System controller 320 may be provided to control communications system 390. For example, system controller 320 may be a computer system programmed to control a core communications system, such as all or part of the communications system in a metropolitan market, a regional communications system, a commercial wireless communications service provider's entire network, etc. System controller 320 may also be an interface for manually controlling the operations of a core communications system or the like. As one example, system controller 320 is a computer system programmed to execute control scripts (e.g., Perl scripts, Tcl scripts, Python scripts, Ruby scripts, LabVIEW scripts, etc.) to control OMC 330 and/or other elements. Likewise, a signal system controller 320 may be employed to control multiple OMCs.

As illustrated, OMC 330 is coupled to system controller 320, switch 340, base station controller 350, RNC 360, and cell site 110. OMC 330 may also be configured to provide a centralized platform from which a commercial wireless communications service provider may monitor and control operational aspects of the elements of communications system 390. OMC 330 may enable control of both radio elements and switching elements of communications system 390. OMC 330 may be configured to manage any number of switches, base station controllers, RNCs, and cell sites.

Switch 340 may be coupled to OMC 330, base station controller 350, and RNC 360. For example, switch 340 may be configured to switch voice traffic from one or more base station controllers to public switched telephone network (PTSN) or to a telephone switch such as a 5ESS switch, a Private Branch Exchange switch, and/or the like via signal VOICE. Likewise, switch 340 may be further configured to switch data from one or more RNCs to a data network, to a router, to a switch, and/or the like via signal DATA. Also, switch 340 may include a mobile switching center (MSC), a media gateway, a call gateway, and/or the like.

Base station controller 350 may be coupled between switch 340 and cell site 110 to control certain operational aspects of base station 312 of cell site 110. For example, base station controller 350 may be configured to control handoffs, network registration for mobile devices, channel allocation, radio transmitter output power, and/or the like. Likewise, base station controller 350 may be configured to adjust a C1 value based, at least in part, on control from system controller 320 or OMC 330. Base station controller 350 may be employed to control any number of base stations.

RNC 360 may be coupled between switch 340 and cell site 110 to control certain operational aspects of Node-B 314 of cell site 110. Also, RNC 360 may be employed to control any number of Node-Bs. As an example, RNC 360 may be a UMTS counterpart of base station controller 350.

As stated above, cell site 110 may include base station 312, Node-B 314, commercial power interface 315, back-up power circuit 316, and antenna interface 319. Back-up power circuit 316 may include battery circuit 317 and back-up generator 318. In typical communications systems, base station 312 and Node-B 314 are configured to provide a low-level radio interface to mobile devices under the control of base station controller 350 and RNC 360. For example, base station 312 may provide low-level GSM radio interfacing while Node-B 314 provides low-level UMTS radio interfacing. Also, cell site 110 may include limited command and control functionality or no command and control functionality. Instead, base station controller 350 and/or RNC 360 may provide such functionality while cell site 110 merely provides a physical layer interface to associated mobile devices. Node-B 314 may also be configured to provide tilt signal TILT to remote tilt mechanism 130.

Commercial power interface 315 may receive power from a commercial power source via line AC and provide the received commercial power to base station 312, Node-B 314, and to back-up power circuit 316. Back-up power circuit 316 may receive power from commercial power interface 315 to charge/recharge battery circuit 316 and back-up power circuit 316 may provide power to base station 312 and Node-B 314 during reduced availability of a power source.

Cell site 110 may also include antenna interface 319 to provide a physical interface between base station 312, Node-B 314, and antenna 140. For example, antenna interface 319 may be a smart bias tee that is configured to physically interface the RF signals between of base station 312, Node-B 314, and antenna 140. A smart bias tee may be further adapted to provide power to a receiver preamplifier in antenna 140.

In other examples, antenna interface 319 may include duplexers, diplexers, multiplexers, and/or the like. Also, antenna interface 319 may be omitted in certain cell sites. For example, base station 312 may be configured to receive RF signals from Node-B 314 and couple these and other RF signals to antenna 140.

In operation, communications system 390 is configured to enable and disable various power conservation features at cell site 110 based, at least in part, on a power source availability status, as discussed above. As one example, power conservation features may be enabled and disabled by system controller 320 or OMC 330. However, in other communications systems, power conservation features may also be controlled by switch 340, base station controller 350, RNC 360, or within cell site 110. Likewise, tilt signal TILT may be provided to remote tilt mechanism 130 from a suitably equipped base station 312 and/or the like.

Illustrative Logical Diagram

Figure 4:
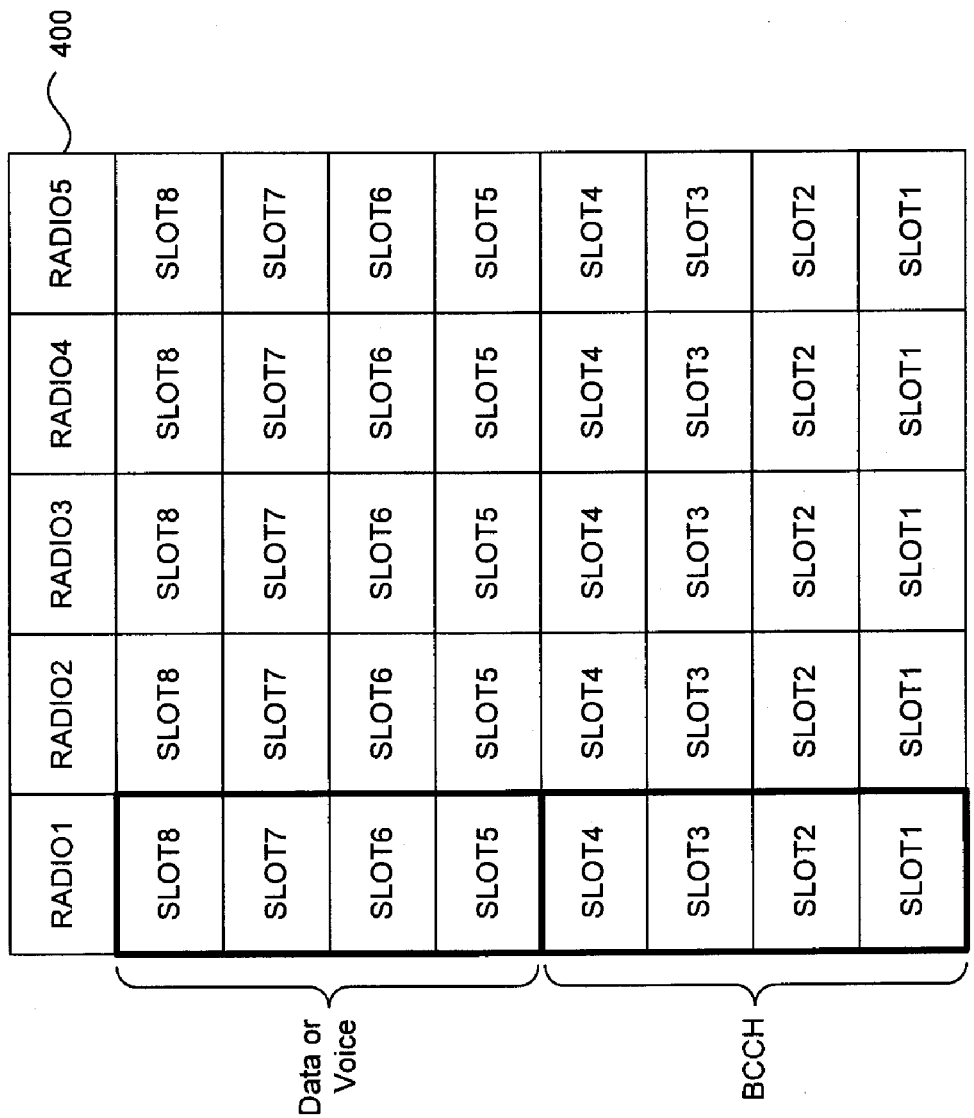
FIG. 4 is a logical diagram of a radio shelf usable in the base station of FIG. 3.

FIG. 4 is a logical diagram of radio shelf 400 usable in base station 312 of FIG. 3. As shown, radio shelf 400 includes radios RADIO1-RADIO5. Each of radios RADIO1-RADIO5 includes logical slots SLOT1-SLOT8.

As discussed above, cell site 110 may be configured to reallocate communications between radios and logical slots of cell site 110 based, at least in part, on a power source availability status and on environmental parameters.

As one example, RADIO1 is a broadcast control channel (BCCH) radio that is configured to broadcast base station identification, synchronization data, control information, other data, and/or the like over one or more BCCH logical slots. In a typical system, these BCCH slots are broadcast at full power to provide increased visibility of cell site 110 throughout its service area. Accordingly, other logical slots of the BCCH radio and/or near the BCCH slot may experience increased interference due to adjacent channel interference, inter-symbol interference, and/or the like.

In one system, SLOT1-SLOT4 of RADIO1 are employed to transmit BCCH data while SLOT5-SLOT8 of RADIO 1 are left unused, or employed to transmit lower priority traffic. Lower priority traffic may include traffic that does not substantially benefit from low latency transmission and may include Short Message Service (SMS) messages, wireless data, and/or the like. For example, such allocation may improve C/I for other logical slots allocated to higher priority voice traffic. Also, radios and logical slots allocated to voice traffic may employ RF output transmit power control on a per connection (e.g., voice call) or per logical slot basis to increase the C/I for other logical slots.

However, during a period of reduced power source availability, the benefits of increased C/I may be outweighed by power conservation requirements. Accordingly, voice traffic may be transmitted from the BCCH radio to reduce the number of operating radios. Likewise, the bit-rate of voice traffic may also be decreased to "pack" additional voice calls onto the BCCH radio. For example, SLOT5-SLOT8 of RADIO1 may be employed to enable 8 half-rate voice calls.

Illustrative Logical Flow Diagram

Figure 5:
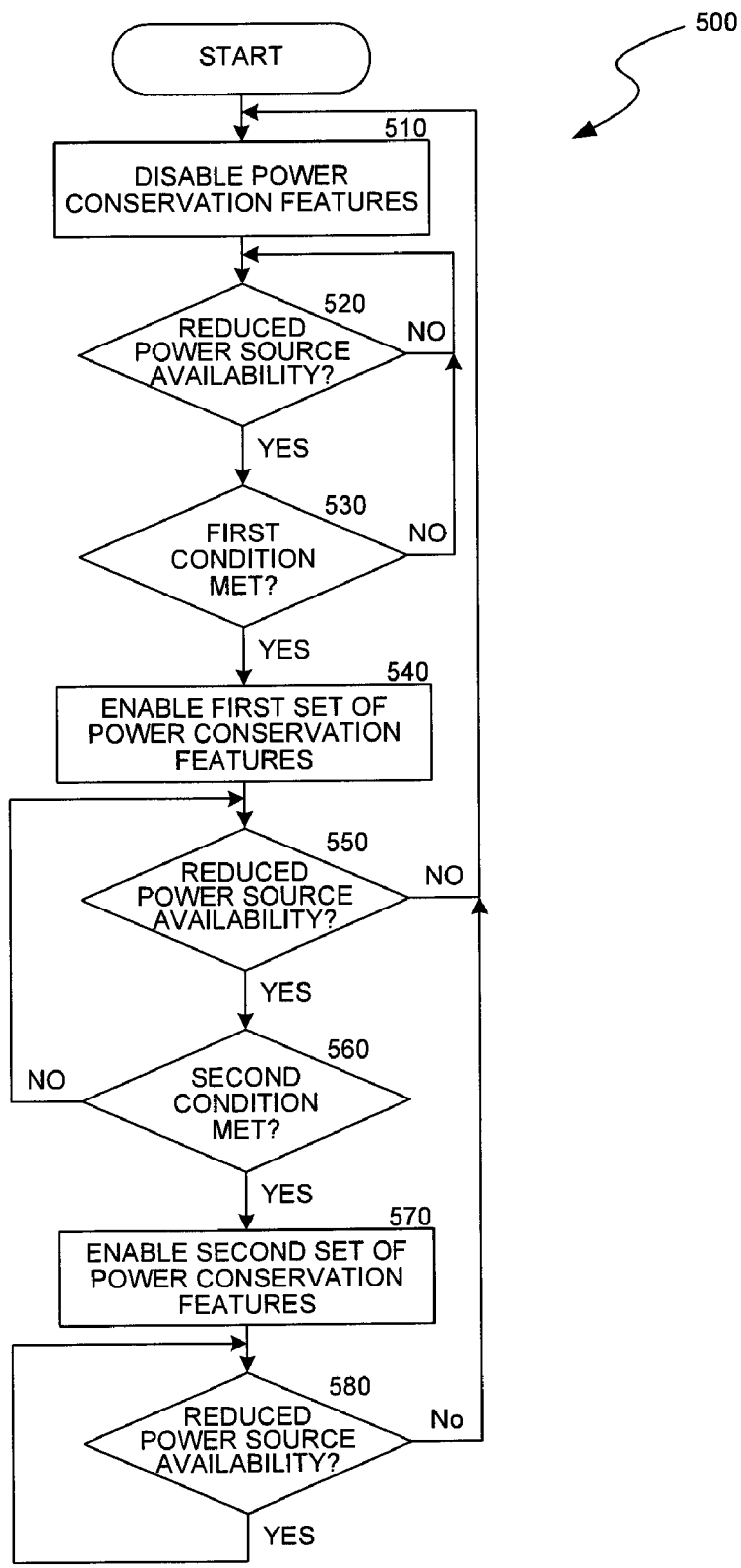
FIG. 5 is a logical flow diagram of a process for conserving power in a communications system.

FIG. 5 is a logical flow diagram of process 500 for conserving power in a communications system. For clarity, process 500 is described below as being performed by particular elements of communications system 390 of FIG. 3. However, process 500 may also be, for example, performed by other processors, by other elements, or in other systems whether or not such processors, elements, or systems are described herein. In addition, process 500 may be stored in non-volatile memory.

Flowing from a start block, processing begins at step 510 where cell site 110 disables power conservation features. For example, system controller 320, OMC 330, switch 340, base station controller 350, and/or RNC 360 may instruct cell site 110 to disable power conservation features. As discussed above, cell site 110 may operate with power conservation features disabled to increase call quality and/or the like while cell site 110 is powered from a commercial power source. In addition, OMC 330 or system controller 320 may also clear alarms at step 510.

At decision block 520, cell site 110 determines the availability of a power source. Also, cell site 110 may transmit an alarm to OMC 330, report reduced availability to system controller 320, and/or the like. Cell site 110 may transmit the alarm, signal, or report on backend interface 120, on an over-the-air interface, and/or the like. Within cell site 110, base station 312 may determine the power source availability. However, in other cell sites, Node-B 314 and/or other elements may determine the power source availability status. If cell site 110 determines that there is reduced power source availability, processing flows to decision block 530. Otherwise, processing stays at decision block 520.

At decision block 530, system controller 320 or OMC 330 determines if a first condition is met. Table 2, below, includes some example of possible conditions.

TABLE 2 power conservation conditions.

| 1 | a duration of reduced power source availability (e.g., zero minutes, 10 minutes, etc.) |
| 2 | the quantity (e.g., number or percentage) of cell sites, sectors, radios, and/or the like experiencing reduced power source availability |
| 3 | a status of a back-up power supply |
| 4 | the load (e.g., number of connected calls, amount of data traffic, volume of communications, etc.) on the cell site |

System controller 320 or OMC 330 may monitor these and other conditions. If system controller 320 or OMC 330 determines that the first condition is met, it moves processing to step 540. Otherwise, it returns processing to decision block 520.

In one system, system controller 320 moves processing to step 540 after cell site 110 has operated from back-up power for 10 minutes, after a voltage of the back-up power supply changes to −54 volts, when five cell sites or 10% of cell sites in a geographical area experience reduced power source availability, and/or the like. In another system, system controller 320 moves processing to step 540 after cell site 110 has operated from back-up power for 15 minutes. Such a delay time may be employed to confirm and/or ensure that reduced power source availability is due to, for example, a power outage. However, any other suitable thresholds and/or conditions may be employed.

At step 540, cell site 110 enables a first set of power conservation features. As one example, system controller 320 may transfer traffic to the BCCH radio. In another example, system controller 320 may alternately or additionally up-tilt antenna 140 by approximately 2° while reducing the RF output transmit power by 2 dB. In yet another example, a cell site without an electrically tiltable antenna may employ other power conservation. For example, a cell site may reduce the transmit power for the BCCH radio by 2 dB while adjusting a C1 value and/or a receiver access minimum value to maintain the communications range of the cell site while conserving power. Processing continues at decision block 550.

Conditions may be selected from Table 2 and corresponding power conservation factors may be selected from Table 1 by a network administrator, defined in a configuration or script file, dynamically determined via machine learning (e.g., artificial intelligence), and/or the like.

At decision block 550, cell site 110 determines if there is reduced power source availability (e.g., an outage has not ended). As discussed above, this determination may, for example, be made by base station 312 or Node-B 314. If cell site 110 determines that there is reduced power source availability, processing flows to decision block 560. Otherwise, processing flows to step 510. Some or all power conservation features may also remain enabled for a period of time after cell site 110 detects the end of the reduced power source availability. Such a delay may be employed to confirm and/or ensure that the power source is providing stable power, to provide additional charging current to a back-up battery circuit, and/or the like. In one system, a delay of 30 minutes is employed before processing flows to step 510. However, no delay, or any other suitable delay, may be employed in other systems.

At decision block 560, cell site 110 determines if a second condition has been met. As discussed above, this determination may, for example, be made by base station 312 or Node-B 314. The second condition may include conditions discussed above with regard to decision block 530 and Table 2. System controller 320 or OMC 330 may be employed to determine if the second condition is met and may employ different thresholds, combinations of conditions, and/or the like to determine if the second condition is met. If system controller 320 or OMC 330 determines that the second condition is met, it moves processing to step 570. Otherwise, it returns processing to decision block 550.

In one system, system controller 320 moves processing to step 540 after cell site 110 has operated from back-up power for 20 minutes, after a voltage of the back-up power supply changes to −52 volts, when seven cell sites or 5% of cell sites in a geographical area experience reduced power source availability, and/or the like. However, any other suitable thresholds and/or conditions may be employed.

At step 570, cell site 110 enables a second set of power conservation features. Step 570 may include enabling additional power conservation features or may include changing parameters of the first set of power conservation features to further increase power conservation, such as those selected from Table 1, above.

As one example, system controller 320 may transfer traffic to the BCCH radio, up-tilt antenna 140 by approximately 4°, and reduce the RF output transmit power 4 dB. Processing continues at decision block 550. Such a change can reduce the total power consumption of a 15 transceiver cell site from approximately 40 amperes to approximately 27 amperes as approximately a 32% decrease in power consumption while maintaining the cell site's coverage area. As discussed above, any other suitable elevation difference angles may be employed.

Processing then continues at decision block 580 where cell site 110 determines if there is reduced power source availability (e.g., an outage has not ended). If cell site 110 determines that there is reduced power source availability, processing remains at decision block 580. Otherwise, processing returns to block 510. As discussed above, some or all power conservation features may remain enabled for a period of time after cell site 110 detects the end of the reduced power source availability.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

I claim:

1. A system for facilitating wireless communications, comprising:
  a cell site configured to selectively employ at least five power conservation features from multiple power conservation features based, on a power source availability status, wherein the cell site comprises:
   a power interface configured to provide power to the cell site from a power source;
   a back-up power circuit configured to provide power to the cell site based, on the power source availability status; and
   a tiltable antenna configured to facilitate the wireless communications of the cell site, and wherein the multiple power conservation features include:
    a) selective tilting of the tiltable antenna site;
    b) selective control of an RF output transmit power level of the cell site;
    c) selective control of a communications bit rate;
    d) transfer of communications to adjacent cell sites;
    e) adjustment of indicators such that associated mobile devices transfer communications to the adjacent cell sites; and
    f) reallocation of communications between radios and logical slots of the cell site; and
  an operations and maintenance center (OMC) configured to communicate with and control the operations of the cell site and the other cell sites.

2. The system of claim 1, further comprising:
  a system controller configured to communicate with the OMC and to selectively enable and disable each of the multiple power conservation features based, at least in part, on the power source availability status and on power source availability statuses of the other cell sites;
  a base station controller (BSC) coupled to the cell site and configured to control Global System for Mobile Communications (GSM) functionality of the cell site;
  a Radio Network Controller (RNC) coupled to the cell site and configured to control Universal Mobile Telecommunications System (UMTS) functionality of the cell site;
  a switch coupled to the BSC and to the RNC and configured to switch voice traffic from the cell site to a public switched telephone network (PTSN) and to route data traffic from the cell site to a data network; and
  a remote tilt mechanism that is configured to selectively tilt the tiltable antenna, based, at least in part, on a tilt signal from the cell site.

3. The system of claim 1, wherein the selective enabling and disabling of the power conservation features are based, at least in part, on a carrier to interference ratio (C/I), a signal to noise ratio (SNR), a bit error rate (BER), or a frame error rate (FER); and wherein selective control of the communications bit rate includes selecting a codec from among a full-rate codec, an enhanced full-rate codec, a half-rate codec, and one or more modes of an adaptive multi-rate codec and further includes adjustment of a discontinuous transmission (DTX) threshold.

4. The system of claim 1, wherein the adjustment of indicators such that associated mobile devices transfer communications to the other cell sites includes adjustment of a cell 1 reselect value; wherein reallocation of communications between radios and logical slots of the cell site includes allocating voice traffic onto logical slots of a broadcast control channel (BCCH) radio; and wherein the selective tilting of the tiltable antenna includes up-tilting the antenna during a reduced availability period of a power source.

5. The system of claim 1, wherein the system controller is further configured to selectively enable and disable each of the multiple power conservation features based, at least in part, on each of the following conditions:
  i) a duration during which the power source availability status has indicated a reduced availability;
  ii) a quantity of cell sites for which associated power source availability statuses indicate reduced availabilities;
  iii) a status of the back-up power circuit; or
  iv) a load of the cell site.

6. An apparatus for facilitating wireless communications with a wireless telecommunications cell site, wherein the cell site includes an antenna, comprising:
   a cell site controller configured to selectively employ at least three of multiple power conservation features based on a power source availability status, wherein the multiple power conservation features include:
      a) selective adjustment of an RF coverage of the antenna;
      b) selective control of an RF output transmit power level;
      c) selective control of a communications bit rate;
      d) transfer of communications with associated mobile devices to neighboring cell sites;
      e) adjustment of indicators such that associated mobile devices transfer communications to the neighboring cell sites; and
      f) selective employment of a broadcast control channel (BCCH) radio to transmit voice traffic;
   wherein the cell site controller is further configured to selectively enable and disable at least three of the multiple power conservation features based on at least one of the following conditions:
      i) a duration during which the power source availability status has indicated a reduced availability;
      ii) a quantity of cell sites for which associated power source availability statuses indicate reduced availabilities;
      iii) a status of a back-up power supply of the cell site; or
      iv) a communications traffic load of the cell site.

7. The apparatus of claim 6, further comprising:
   a base station controller (BSC) coupled to the cell site and configured to control Global System for Mobile Communications (GSM) functionality of the cell site;
   a Radio Network Controller (RNC) coupled to the cell site and configured to control Universal Mobile Telecommunications System (UMTS) functionality of the cell site;
   a switch coupled to the BSC and to the RNC and configured to switch voice traffic from the cell site to a public switched telephone network (PTSN) and to route data traffic from the cell site to a data network, wherein the switch includes a mobile switching center (MSC), a media gateway, or a call gateway;
   the antenna; and
   a remote tilt mechanism that is configured to selectively tilt the antenna, based, at least in part, on a tilt signal from the cell site.

8. The apparatus of claim 6, wherein the cell site controller is further configured as a Long Term Evolution cell site controller.

9. The apparatus of claim 6, wherein the cell site controller is further configured to selectively enable and disable each of the multiple power conservation features based, at least in part, on the power source availability status.

10. The apparatus of claim 6, wherein the selective employing of the power conservation features are based, at least in part, on a carrier to interference ratio (C/I), a signal to noise ratio (SNR), a bit error rate (BER), or a frame error rate (FER).

11. The apparatus of claim 6, wherein the adjustment of an RF coverage of the antenna includes mechanically tilting the antenna.

12. The apparatus of claim 6, wherein the adjustment of an RF coverage of the antenna includes tilting the antenna by electrically beam-steering the antenna.

13. The apparatus of claim 6, wherein selective control of the communications bit rate includes selecting a codec from among a full-rate codec an enhanced full-rate codec, a half-rate codec, and one or more modes of an adaptive multi-rate codec.

14. The apparatus of claim 6, wherein selective control of the communications bit rate includes adjustment of a discontinuous transmission (DTX) threshold.

15. The apparatus of claim 6, wherein the adjustment of indicators such that associated mobile devices transfer communications to the other cell sites includes adjustment of a cell 1 reselect value or a cell 2 reselect value.

16. The apparatus of claim 6, wherein employment of the BCCH radio includes allocating voice traffic onto logical slots of the BCCH radio.

17. A method of conserving power in a wireless communications cell site having a radio and associated telecommunications components, the method comprising:
   detecting an availability status of a power source;
   determining if a first condition has been met, wherein the first condition includes one or more of the following conditions:
      i) a duration during which the power source availability status has indicated a reduced availability;
      ii) a quantity of cell sites for which associated power source availability statuses indicate reduced availabilities;
      iii) a status of a back-up power supply of the cell site; and
      iv) a telecommunications traffic load of the cell site; and
   enabling at least one power conservation feature of a first set of power conservation features, wherein the first set of power conservation features includes the following:
      a) selective adjustment of an RF coverage of an antenna;
      b) selective control of an RF output transmit power level;
      c) selective control of a communications bit rate;
      d) transfer of communications to neighboring cell sites;
      e) adjustment of indicators such that associated mobile devices transfer communications to the neighboring cell sites; and
      f) reallocation of communications between radios and logical slots of the cell site.

18. The method of claim 17, further comprising:
   determining if a second condition has been met, wherein the second condition includes at least one unsatisfied condition of conditions i-iv; and
   enabling a second conservation feature of a second set of power conservation features, wherein the second set of power conservation features includes at least one power conservation feature unenabled by the first set of power conservation features.

19. The method of claim 17, wherein the adjustment of the RF coverage of the antenna includes mechanically up-tilting the antenna.

20. The method of claim 17, wherein the adjustment of the RF coverage of the antenna includes beam-steering the RF coverage of the antenna.

21. The method of claim 17, wherein selective control of the communications bit rate includes selecting a codec from among a full-rate codec, an enhanced full-rate codec, a half-rate codec, and one or more modes of an adaptive multi-rate codec.

22. The method of claim 17, wherein selective control of the communications bit rate includes adjustment of a discontinuous transmission (DTX) threshold.

23. The method of claim 17, wherein the adjustment of indicators such that associated mobile devices transfer communications to the other cell sites includes adjustment of a cell 1 reselect value or a cell 2 reselect value.

24. The method of claim 17, wherein reallocation of communications between radios and logical slots of the cell site includes allocating voice traffic onto logical slots of a broadcast control channel (BCCH) radio.

25. The apparatus of claim 17, wherein the cell site operates as a Long Term Evolution cell site.

26. A tangible processor-readable medium for executing a method of conserving power in a wireless communications system, the method comprising:
   detecting an availability status of a power source;
   determining if a first condition has been met, wherein the first condition includes one or more of the following conditions:
      i) a duration during which the power source availability status has indicated a reduced availability;
      ii) a quantity of cell sites for which associated power source availability statuses indicate reduced availabilities;
      iii) a status of a back-up power supply of the cell site; and
      iv) a telecommunications traffic load of the cell site; and
   enabling a first set of power conservation features, wherein the first set of power conservation features includes the following:
      a) selective adjustment of an RF coverage of an antenna;
      b) selective control of an RF output transmit power level;
      c) selective control of a communications bit rate;
      d) transfer of communications to neighboring cell sites;
      e) adjustment of indicators such that associated mobile devices transfer communications to the neighboring cell sites; and
      f) reallocation of communications between radios and logical slots of the cell site.

27. The tangible processor-readable medium of claim 26, wherein the selective adjustment of the RF coverage of the antenna includes tilting the antenna during a reduced availability period of the power source; wherein selective control of the communications bit rate includes selecting a codec from among a full-rate codec, an enhanced full-rate codec, a half-rate codec, and one or more modes of an adaptive multi-rate codec; wherein selective control of the communications bit rate includes adjustment of a discontinuous transmission (DTX) threshold; wherein the adjustment of indicators such that associated mobile devices transfer communications to the other cell sites includes adjustment of a cell 1 reselect value or a cell 2 reselect value; and wherein reallocation of communications between radios and logical slots of the cell site includes allocating voice traffic onto logical slots of a broadcast control channel (BCCH) radio.

28. A system for facilitating wireless communications, comprising:
   means for detecting a reduced availability of a power source;
   means for determining if a first condition has been met, wherein the first condition includes one or more of the following conditions:
      i) a duration during which the power source availability status has indicated a reduced availability;
      ii) a quantity of cell sites for which associated power source availability statuses indicate reduced availabilities;
      iii) a status of a back-up power supply of the cell site; and
      iv) a telecommunications traffic load of the cell site; and
   means for enabling a first set of power conservation features, wherein the first set of power conservation features includes the following:
      a) selective adjustment of an RF coverage of an antenna;
      b) selective control of an RF output transmit power level;
      c) selective control of a communications bit rate;
      d) transfer of communications to neighboring cell sites;
      e) adjustment of indicators such that associated mobile devices transfer communications to the neighboring cell sites; and
      f) reallocation of communications between radios and logical slots of the cell site.

29. The system of claim 28, wherein the selective adjustment of the RF coverage of the antenna includes up-tilting the antenna during a reduced availability period of the power source; wherein selective control of the communications bit rate includes selecting a codec from among a full-rate codec, an enhanced full-rate codec, a half-rate codec, and one or more modes of an adaptive multi-rate codec; wherein selective control of the communications bit rate includes adjustment of a discontinuous transmission (DTX) threshold; wherein the adjustment of indicators such that associated mobile devices transfer communications to the other cell sites includes adjustment of a cell 1 reselect value or a cell 2 reselect value; and wherein reallocation of communications between radios and logical slots of the cell site includes allocating voice traffic onto logical slots of a broadcast control channel (BCCH) radio.

* * * * *

UNITED STATES PATENT AND TRADEMARK OFFICE
CERTIFICATE OF CORRECTION

| | | |
|---|---|---|
| PATENT NO. | : 8,005,510 B2 | Page 1 of 1 |
| APPLICATION NO. | : 12/170696 | |
| DATED | : August 23, 2011 | |
| INVENTOR(S) | : Steve Fischer et al. | |

It is certified that error appears in the above-identified patent and that said Letters Patent is hereby corrected as shown below:

In column 11, line 64, in claim 1, delete "based," and insert -- based --, therefor.

In column 12, line 2, in claim 1, delete "based," and insert -- based --, therefor.

In column 14, line 1, in claim 13, delete "codec" and insert -- codec, --, therefor.

Signed and Sealed this
Seventh Day of February, 2012

David J. Kappos
*Director of the United States Patent and Trademark Office*